Patented June 27, 1933

1,915,882

UNITED STATES PATENT OFFICE

KARL EHMKE, OF HAMBURG, GERMANY

PROCESS FOR ATTACHMENT OF RUBBER PLATES TO LEATHER OR THE LIKE

No Drawing. Application filed February 1, 1930, Serial No. 425,355, and in Germany September 26, 1929.

The present invention relates to a process for attaching rubber plates to leather or the like, and has for its object to render the detachment of the rubber plates impossible and to eliminate the use of additional mechanical attaching means.

It is well known that rubber plates can be secured to leather or the like by means of a rubber solution, but when, for example dealing with rubber soles, rubber heels or the like additional attaching means such as wire, pins, sewing and the like must also be used as otherwise the connection formed by the rubber solution between the rubber plate and its support is not sufficiently elastic and is released by reason of unavoidable movement and strains. The additional securing means such as nails, sewing and so forth have, however, the disadvantage that the rubber plates are torn through and damaged when strains occur.

These disadvantages are adapted to be eliminated in accordance with the present invention by means of a process which enables rubber plates to be secured in position without any mechanical securing means, whilst the connection affords sufficient elasticity for all purposes.

According to the present invention the rubber plate is somewhat roughened by means of a roller covered with sand paper or another grinding roller, coated with the rubber solution, and on the rubber plate thus prepared there is sprayed a layer of finely ground crepe rubber. The sprayed crepe rubber layer is uniformly pressed on by means of a roller, and the crepe rubber particles are uniformly distributed by the said paper or grinding roller. The sprayed crepe rubber layer is then coated with rubber solution and gummed and hammered on the leather or the like which is also coated with rubber solution.

The sprayed layer is preferably produced by grinding a crepe rubber plate or a crepe rubber block against a rotary grinding disc whereby the crepe rubber particles which are ground off and projected on the rubber plate form the sprayed layer on the rubber plate.

For simplifying the process the rubber plates may be provided in the factory with the sprayed layer and placed on the market in this condition. The operator then only requires to coat the sprayed layer with rubber solution, and it is then possible to secure the rubber plate to its support. Should the sprayed layer have become somewhat greasy or dry it is only necessary to superficially grind this by means of a grinding disc.

Finely ground crepe rubber may also be sprayed as an alternative directly upon the layer, for example the shoe sole, and used as the sole surface or the like itself for which purpose the sprayed layer may be made more or less thick.

Having now particularly described and ascertained the nature of my said invention and in what manner the same is to be performed, I declare that what I claim is:

1. A process of securing rubber plates such as rubber soles and heels to leather or the like, comprising coating the side of the rubber to be attached with rubber cement, spraying a layer of crepe rubber on said side, then coating the latter with the rubber solution and applying it and hammering it upon the leather or the like to which a rubber solution has also been applied.

2. A process for securing rubber plates, such as rubber soles and heels, to leather and the like, comprising the steps of coating a side of a rubber plate with a binding substance, grinding a piece of crepe rubber, collecting the ground particles on said side of the rubber plate, coating said side with a rubber solution, and bringing said rubber plate in contact with a piece of material to which a rubber solution has also been applied.

3. A process for securing rubber plates, such as rubber soles and heels, to leather and the like, comprising the steps of coating a rubber article with a binding substance, spraying a layer of ground crepe rubber on said rubber article, applying a rubber solution to said layer, and bringing said rubber article in contact with a piece of material.

4. A process for securing rubber plates, such as rubber soles and heels, to leather and the like, comprising the steps of roughening a surface of a rubber plate, applying a rubber solution to said surface, spraying a layer of ground crepe rubber on said surface, applying a rubber solution to said layer, applying a rubber solution to a piece of material, and bringing said rubber plate in contact with said piece of material.

In testimony whereof I have affixed my signature.

KARL EHMKE.